Dec. 13, 1966 R. E. WARNER 3,291,882
METHOD FOR PRODUCING THIN-WALLED HOLLOW POLYLACTAM ARTICLES
Filed Nov. 21, 1963
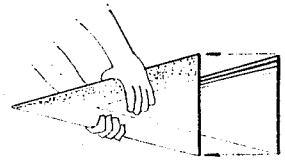
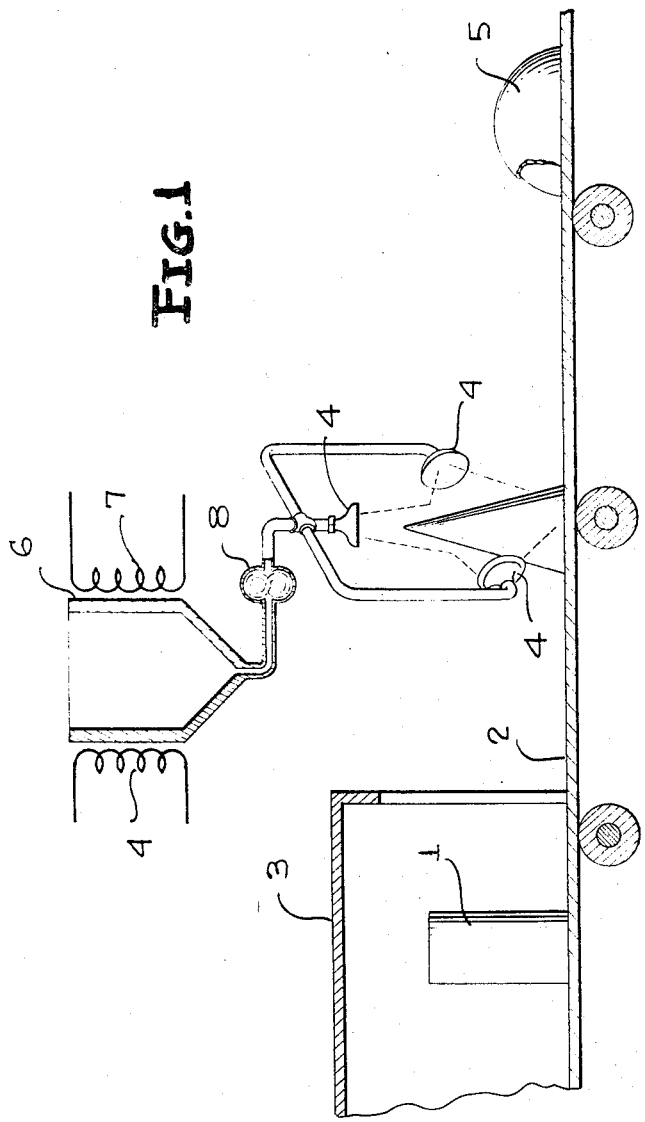
INVENTOR
ROBERT E. WARNER

United States Patent Office 3,291,882
Patented Dec. 13, 1966

3,291,882
METHOD FOR PRODUCING THIN-WALLED HOLLOW POLYLACTAM ARTICLES
Robert E. Warner, Sinking Spring, Pa., assignor, by mesne assignments, to The Polymer Corporation, a corporation of Pennsylvania
Filed Nov. 21, 1963, Ser. No. 325,232
1 Claim. (Cl. 264—300)

This invention relates to methods for preparing cast polylactam articles and more particularly is concerned with methods for spray casting hollow articles.

New methods have been developed for the polymerization of higher lactams that enable, when desired, conducting a rapid polymerization of the higher lactams at temperatures above the melting point of the lactam, but below the melting point of the resulting polylactam. For convenience, these processes are herein referred to as low temperature anionic polymerization processes and are described more fully below.

Utilization of these processes makes it possible to cast polylactam articles directly from monomer by adding a reactive lactam monomer to a mold and conducting the polymerization in situ in the mold. As the melting point of the polylactam is not exceeded, the high pressures required by conventional melt forming methods are avoided, and many other production advantages result.

It has now been discovered that these techniques for the low temperature anionic polymerization of higher lactams may be utilized in preparing hollow articles by means of what is herein referred to as spray casting methods.

Accordingly, it is a principal object of this invention to provide methods for preparing hollow articles by spray casting techniques utilizing low temperature processes for the anionic polymerization of higher lactams.

It is another object of this invention to provide improved methods for preparing hollow polylactam shapes.

Yet another object of this invention is to produce thin walled polylactam articles.

Still another object of this invention is to prepare hollow polylactam articles by novel processes wherein the article is formed simultaneously with the polymerization of a higher lactam.

Briefly, the objects of this invention are achieved by preparing a mold of the desired configuration, spraying a reactive mixture of a lactam monomer onto the mold, polymerizing the lactam on the mold below the melting point of the resulting polylactam and, after the polymerization is complete, stripping or removing the shaped polylactam article from the mold.

The low temperature anionic polymerization of lactams referred to above is disclosed, for example, in U.S. Patents 3,015,542, 3,017,391, 3,017,392, and 3,018,273.

Briefly, the above patents disclose the novel polymerization of higher lactams, i.e., lactams containing at least six carbon atoms in the lactam ring, for example, ε-caprolactam, enantholactam, caprylolactam, decanolactam, undecanolactam, dodecanolactam, pentadecanolactam, hexadecanolactam, methcyclohexanone isoximes, cyclic hexamethylene adipamide and the like, and mixtures thereof, in the presence of an anionic polymerization catalyst, as for example, alkali and alkaline earth metals such as lithium, sodium, potassium, magnesium, calcium, strontium, etc., either in metallic form or in the form of hydrides, borohydrides, oxides, hydroxides, carbonates, etc., organo-metallic derivatives, of the foregoing metals, as well as other metals such as butyl lithium, ethyl potassium, propyl sodium, phenyl sodium, triphenylmethyl sodium, diphenyl magnesium, diethyl zinc, triisopropyl aluminum, diisobutyl aluminum hydride, sodium amide, magnesium amide, magnesium anilide, Grignard reagent compounds such as ethyl magnesium chloride, methyl magnesium bromide, phenyl magnesium bromide and the like, and a promoter compound such as organic isocyanates, ketenes, acid chlorides, acid anhydrides, and N-substituted imide having the structural formula

wherein A is an acyl radical such as carbonyl, thiocarbonyl, sulfonyl, nitroso, phosphinyl, thiophosphinyl, tert.-amino, acylamido, N-substituted carbamyl, N-substituted carbamido, alkoxy, ether groups and the like, A and B, or A and R, together can form a ring system through a divalent linking group, and any free valence bond of the A and B radicals can be hydrogen or R, excepting A directly linked thereto, and the promoter compound preferably has a molecular weight of less than about 1000.

This polymerization of the higher lactams is initiated at temperatures of from about the melting point of the lactam monomer to about 250° C., and preferably from about 125° to about 200° C. As the reaction is exothermic, the initiation temperature will be exceeded under most conditions. The amount of catalyst and promoter compound each can vary from about 0.01 to about 20 mole percent, preferably from about 0.05 to about 5 mole percent, and more preferably still from about 0.1 to about 1 mole percent, all based on the higher lactam being polymerized. The higher lactams preferably contain from 6 to 20 carbon atoms, and more preferably contain from 6 to 12 carbon atoms. The anionic catalyst preferably is a Grignard compound or an alkali metal and hydrides thereof. It will be understood that the anionic catalyst can be reacted in stoichiometric amount with a higher lactam to form a salt thereof, such as sodium caprolactum, and said salt can then be employed in the polymerization process in an equivalent amount to the anionic catalyst as set out hereinabove. This preliminary preparation is particularly desirable as it permits ready removal of hydrogen gas from the system as when sodium or sodium hydride is employed, removal of water as when sodium hydroxide is employed, removal of water and carbon dioxide as when sodium carbonate is employed, etc. Isocyanates and N-substituted imides are the preferred promoter compounds. It will be understood that the use of acid chlorides effects the presence of HCl in the system which preferably is removed therefrom to preclude reaction with the anionic catalyst, whereby extra catalyst would otherwise be required. Similarly, acid anhydrides generate organic acids in the system which then require sufficient anionic catalyst to neutralize the organic acid in addition to the amount desired to function in the polymerization reactions.

In utilizing these polymerization techniques, a reactive lactam monomer is sprayed onto a mold or form, which preferably is heated, and the reactive monomer is polymerized thereon. As used herein, the term "reactive lactam monomer" is meant to describe a higher lactam monomer to which has been added effective quantities of catalyst and a promoter. Accordingly, when the reactive lactam monomer is raised to reaction temperatures as discussed above, polymerization to form a high molecular weight polylactam will rapidly commence.

In the preferred method of this invention, the suitable form or mold is first coated with a mold release agent to facilitate removal of the finished article from the form. Many well known mold release agents may be used, such as the various silicones, provided they do not adversely affect or interfere with the polymerization reaction. Polytetrafluoroethylene is also quite useful when sprayed onto the mold. As an example of a suitable silicone, the product sold under the trade name "Syloff," sold by the Dow Corning Company, may be mentioned.

Internal mold release agents also are helpful in obtaining ready release of the polymerized article from the mold. When these internal release agents are used, they are mixed directly into the reactive lactam monomer prior to the time it is sprayed onto the heated mold and polymerized. These materials must be selected with particular care to insure that they will not adversely interfere with the polymerization reaction or have an adverse effect upon the physical properties of the resulting polylactam. Some ketones of the higher chained fatty acids are particularly suitable as internal release agents. 18-pentatriacontanone and 12-tricosanone are useful examples of these ketones.

The surface condition of the mold will also affect the ease in which the article may be removed. For this reason, it is generally preferred to provide the mold with a highly polished surface. Of course, the surface of the mold should always be clean and dry.

In the preferred method of this invention, the mold, after it has been suitably prepared as above, is heated to a temperature that will initiate rapid polymerization of the reactive monomer. This temperature should not be so great, however, as to cause the reactive monomer to exceed the melting point of the resulting polylactam to any extent. Thus, it is generally preferred to heat the mold as hot as is possible without causing the polymerizing mixture to exceed the melting point of the fully polymerized mass. While this temperature will depend upon many variables, such as the ambient temperature of the surrounding atmosphere, the desired wall thickness of the article, the concentration and type of catalyst and initiator, a temperature in the range of from about 190° C. to 200° C. has been found to be a useful mold temperature when casting articles from epsilon-caprolactam.

Control of the wall thickness of articles prepared in accordance with this invention may be obtained by several procedures. It is, of course, obvious that the wall thickness will vary in direct proportion to the amount of reactive monomer sprayed onto the mold. Utilizing one procedure, an initial quantity of reactive lactam monomer is sprayed onto the heated mold and, as the viscosity of the material begins to increase due to the polymerization reaction, additional quantities of reactive monomer are sprayed onto the initial layer.

Thixotropes may also be used with advantage to obtain thicker wall sections since, when added to the reactive monomer, they increase the viscosity of the monomer and allow a greater quantity of monomer to be retained on the mold without running or dripping. As is the case with mold release agents, thixotropes should be selected from materials that will not interfere with the polymerization reaction or adversely affect the desired physical properties of the polymerized article. As suitable examples of these may be mentioned hydroxy methyl cellulose; colloidal silica sold, for example, under the trademark "Cab-O-Sil" by Godfrey L. Cabot, Inc. of Boston, Mass.; nitrile latex; polystyrene; butyl rubber; and polyamides. Ordinarily, from about ½% to 1% by weight of these thixotropes will be effective to increase the viscosity of the reactive monomer, though it is to be understood that the exact quantity added will depend on the desired viscosity of the reactive monomer.

It is generally convenient to provide a mold of a moderately large mass compared to the mass of the reactive monomer that will be sprayed onto it. Thus, the heat capacity of the mold will generally be sufficient to raise the temperature of the reactive lactam to polymerization temperatures even though the reactive mixture is stored at temperatures just above the melting point of the lactam. These low storage temperatures are advantageous as they enable reactive monomer to be detained for prolonged periods without premature reaction. If it is inconvenient to provide the mold with the desired heat capacity, it may, of course, be provided with self-contained heating means such as electrical elements.

For other purposes, it may sometimes be desirable to raise the temperature of the reactive monomer to temperatures closely approaching rapid polymerization temperatures. If this is done, it is to be understood that the pot life of the reactive monomer will be considerably diminished.

In another method of this invention, the reactive monomer is raised to polymerization temperatures by means of heating elements positioned adjacent or within the discharge nozzle of the spray device. While this technique is sometimes useful, it requires more careful control and surveillance due to the difficulty of adjusting the thermal transfer rate with the flow of reactive monomer through the nozzle. Also, difficulties may be encountered due to the fact that some polymerization may occur within the heat exchange device and cause a buildup of polymerized material that periodically must be removed. It is advantageous, however, in that sufficient heat may be supplied to the reactive monomer to make it sometimes unnecessary to heat the mold. This may be desirable if the mold is fabricated from materials that are thermally unstable or have a low heat capacity.

Still another method of this invention encompasses bringing two streams of monomer together in a mixing chamber adjacent the nozzle of the spray gun. Either stream by itself is not reactive, as each will contain either a catalyst or a promoter, but not both. Thus, when the two streams are brought together, the mixture will be fully reactive. Similarly, it is sometimes desirable to mix a concentrated catalyst mixture with an otherwise reactive lactam in the mixing nozzle. These techniques facilitate increasing the temperature of the lactam monomer prior to its contact with the mold without adversely affecting the pot life of the monomer. If carried to extremes, however, it may be subject to the same disability as the heat exchange device in that some reaction may take place within the mixing head and spray head of the spray gun, causing it to become plugged with polylactam.

It has previously been mentioned that a polished mold is desired to aid separation of the polylactam article from the mold. Sometimes, however, it may be desired to provide a textured surface to the article and, for this purpose, the textured pattern may be embossed onto the surface of the mold.

With reference to the drawings:

FIG. 1 schematically illustrates a continuous process for preparing hollow polylactam articles in accordance with this invention.

FIG. 2 shows a polylactam article that has been prepared in accordance with this invention being removed or stripped from a mold.

FIG. 1 illustrates a continuous process wherein different shaped molds 1 are carried on a conveyor 2 through an oven 3 where they are heated to a temperature at which polymerization will take place. Then they pass under and between spray nozzles 4 which coats the molds, polymerizing immediately to a solid form. The thickness of coating 5 can be determined by adjusting the amount of lactam monomer which is sprayed onto the mold or the viscosity of the monomer as described above. Tank 6 contains the reactive lactam monomer. Heaters 7 are used to control the temperature of tank 6 at a temperature above the melting point of the reactive lactam monomer, but below that temperature at which rapid polymerization will be initiated. Gear pump 8 advances the reactive monomer from the tank 6 and through the spray nozzle 4. It is generally convenient to be able variably to control the speed of pump 8 in order that the amount of reactive lactam sprayed onto the mold can be adjusted.

FIG. 2 illustrates the final product being removed from a mold.

The process is more fully illustrated by the following examples:

*Example 1*

An active lactam mixture was produced by adding a $1/100$ mole of an alkali metal hydride catalyst and a $1/200$ mole of acetic anhydride to a lactam monomer (epsilon-caprolactam). The mixture was heated to about 150° C. A mold was then heated to 160° C. and the lactam monomer was then sprayed onto the mold or form. The monomer upon contact with the heated form polymerized immediately producing an easily removable nylon form.

*Example 2*

An active lactam mixture was prepared as in Example 1, using $1/200$ mole of sodium hydride catalyst and $1/200$ mole of a toluene diisocyanate promoter and then heated to 150° C. The mold was heated to 160° C. and the lactam mixture was then sprayed onto the mold or form. The monomer polymerized instantly producing a nylon form which was easily removed from the mold.

In the above description of the drawings and examples, the invention has been described partly with respect to processes in which a stripable coating is applied to forms in more or less of a batch process type operation. It should also be understood that it is within the scope of the invention to provide continuous methods for producing articles such as conduits and hollow tubes by coating an elongated mandrel in a continuous manner. When the coating is then removed, an elongated conduit or tubing will result. The standard techniques for removing this mandrel, such as the use of expandable mandrels and expanding the hollow article away from the mold by means of fluid pressures, are well known in the art and are not discussed here.

It is to be understood that while this invention has been described particularly with respect to spraying reactive lactam monomer onto various molds, similar results can be obtained by utilizing other methods for applying the monomer to the mold, such as by dripping, brushing, and other similar techniques.

I claim:

A method for producing shaped, thin-walled, hollow polylactam articles includes the steps of: applying to a form a molten coating of reactive polymerizable mixture comprised of a higher lactam monomer, a catalyst and a promoter for the polymerization of said monomer, and, as an internal mold release agent, a ketone of a higher chained fatty acid selected from the group consisting of 18-pentatriacontanone and 12-tricosanone; polymerizing said mixture while exposed on said form at temperatures below the melting point of the polylactam; and stripping the resulting polymerized article from the surface of said form.

References Cited by the Examiner

UNITED STATES PATENTS

| | | | |
|---|---|---|---|
| 2,751,628 | 6/1956 | Carpenter et al. | 264—300 |
| 2,789,933 | 4/1957 | Bargmeyer | 264—309 |
| 2,975,071 | 3/1961 | Ferrigno. | |
| 2,990,601 | 7/1961 | Wagner | 264—309 |
| 3,017,391 | 1/1962 | Mottus et al. | |
| 3,046,177 | 7/1962 | Hankins | 264—338 |
| 3,121,768 | 2/1964 | Boyer. | |

OTHER REFERENCES

"Cab-O-Sil, General Properties, Functions and Uses," Cabot Corp., 125 High Street, Boston 10, Massachusetts, C Gen–1, January 1955, revised May, 1960.

ROBERT F. WHITE, *Primary Examiner*.

S. A. HELLER, *Assistant Examiner*.